(No Model.)
I. H. HENLEY.
GATE.
No. 460,134. Patented Sept. 29, 1891.
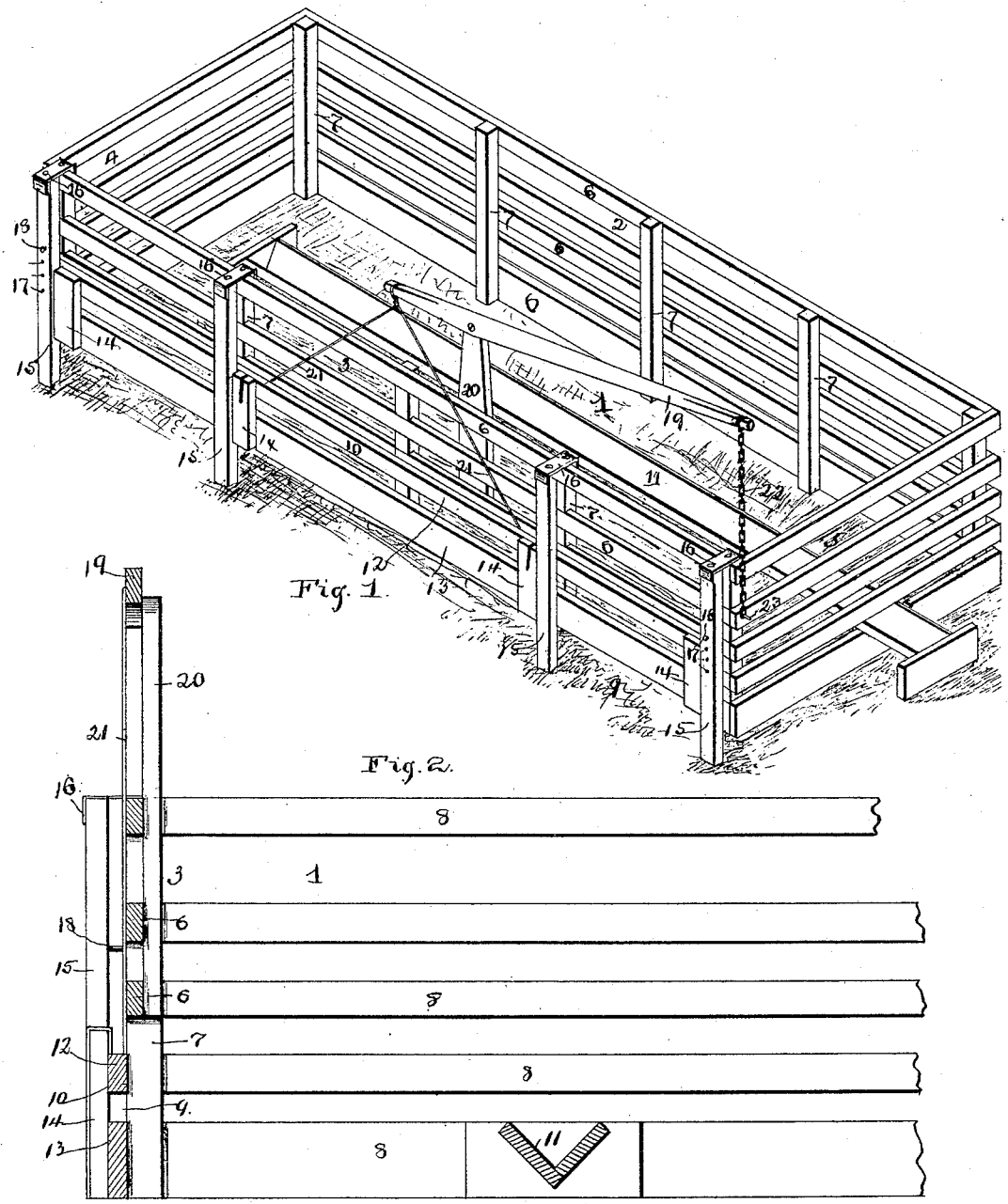

UNITED STATES PATENT OFFICE.

ISAAC H. HENLEY, OF STRAUGHN, INDIANA.

GATE.

SPECIFICATION forming part of Letters Patent No. 460,134, dated September 29, 1891.

Application filed October 3, 1890. Serial No. 367,019. (No model.)

*To all whom it may concern:*

Be it known that I, ISAAC H. HENLEY, a citizen of the United States, residing at Straughn, in the county of Henry and State of Indiana, have invented a new and useful Gate, of which the following is a specification.

The invention relates to improvements in gates for pens.

The object of the present invention is to provide a simple and inexpensive feed trough and pen in which the entrance may be regulated to admit certain-sized animals and exclude larger.

The invention consists in the construction and novel combination and arrangement of parts hereinafter fully described, illustrated in the accompanying drawings, and pointed out in the claim hereto appended.

In the drawings, Figure 1 is a perspective view of a feed trough and pen constructed in accordance with this invention and showing the slide or door raised to permit the entrance of animals. Fig. 2 is a transverse sectional view.

Referring to the accompanying drawings, 1 designates a pen or inclosure, which is preferably rectangular, consisting of sides 2 and 3 and ends 4 and 5, and the sides are composed of horizontal bars 6 and vertical posts 7, and the ends are formed by horizontal bars 8, secured to the end posts of the side sections. The side 3 is provided at its bottom with an opening 9, which extends the entire length of the pen or inclosure and is adapted to be closed or partially closed by a vertically-movable slide or door 10 to exclude animals from a centrally-arranged trough 11, or to admit animals of a certain size and to exclude larger ones. The vertically-movable slide or door 10 is composed of horizontal bars 12 and 13, connected by vertical pieces 14, and it moves in ways formed by vertical bars 15, arranged adjacent to the posts 7 of the side 3 and connected at their upper ends with the said post by a metallic plate 16. The end bars are provided with a series of vertically-arranged perforations 17, through which pass pins 18, which limit the vertical movement of the slide or door 10. The slide or door 10 is operated by a lever 19, which is fulcrumed on an upright 20, rising from and secured to the inner face of the side 3. One end of the lever 19 is connected by wires 21 with the vertical pieces 14 of the slide or door, and the other end of said lever is provided with a chain 22, the links of which are adapted to engage a pin 23, extending from one of the horizontal bars at the end of the pen or inclosure to maintain the slide or door in its elevated or open position. The trough 11 extends longitudinally of the pen or inclosure midway the sides from one end to within a short distance of the other, sufficient space being left between the trough and the pen to permit the animal to readily pass to the other side of the inclosure or pen, and the said trough extends beyond one end of the pen or inclosure to enable slop and other feed to be readily emptied into the trough.

By this construction it will be seen that animals may be excluded from the trough until the proper time for feeding and that the opening may be regulated to admit animals of a certain size and to exclude larger ones, and that animals may be conveniently confined within the pen for branding, dehorning, and similar purposes.

From the foregoing description and the accompanying drawings the construction, operation, and advantages of the invention will readily be understood.

What I claim is—

The combination of a pen or inclosure provided with an opening extending the entire length of one of its sides, the vertical bars arranged adjacent to the side having the opening and forming ways, the end bars being provided with a vertical series of perforations, the pins arranged in the perforations, the slide or door arranged in said ways and extending the entire length of the open side of the pen and being limited in its vertical movement by the said pins, the lever 19, fulcrumed on an upright rising from the side of the pen or inclosure, the wires connecting one end of the lever with the slide or door, the chain secured to the other end of said lever, and the pin 23, projecting from the pen or inclosure and arranged to be engaged by the links of the chain to hold the door or slide when adjusted to permit animals of different sizes to enter, substantially as described.

In testimony that I claim the foregoing as my own I have hereto affixed my signature in presence of two witnesses.

ISAAC H. HENLEY.

Witnesses:
JOHN W. HASKETT,
CHARLES F. RIGGLE.